US008797620B2

(12) United States Patent
Yankov et al.

(10) Patent No.: US 8,797,620 B2
(45) Date of Patent: Aug. 5, 2014

(54) AUTOSTEREOSCOPIC DISPLAY ASSEMBLY BASED ON DIGITAL SEMIPLANAR HOLOGRAPHY

(75) Inventors: Vladimir Yankov, Washington Township, NJ (US); Alexander Goltsov, Troitsk (RU); Igor Ivonin, Yubileinyi (RU); Konstantin Kravtsov, Moscow (RU); Leonid Velikov, San Carlos, CA (US)

(73) Assignee: Ergophos, LLC, San Carlos, CA (US)

( * ) Notice: Subject to any disclaimer, the term of this patent is extended or adjusted under 35 U.S.C. 154(b) by 264 days.

(21) Appl. No.: 13/331,261

(22) Filed: Dec. 20, 2011

(65) Prior Publication Data
US 2013/0155477 A1 Jun. 20, 2013

(51) Int. Cl.
G03H 1/26 (2006.01)
(52) U.S. Cl.
USPC ............................................ 359/23; 359/465
(58) Field of Classification Search
USPC ........................................ 359/1–35, 462–479
See application file for complete search history.

(56) References Cited

U.S. PATENT DOCUMENTS

| 6,686,926 | B1 | 2/2004 | Kaye |
| 7,872,788 | B2 | 1/2011 | Yankov |
| 8,054,329 | B2 | 11/2011 | Shestak et al. |
| 2009/0195539 | A1 | 8/2009 | Kim |
| 2010/0149073 | A1* | 6/2010 | Chaum et al. ................ 345/8 |
| 2011/0175906 | A1 | 7/2011 | Zheng et al. |
| 2011/0255160 | A1 | 10/2011 | Lee et al. |

FOREIGN PATENT DOCUMENTS

| WO | WO 0180548 | 10/2001 |
| WO | WO 2008/086049 | 7/2008 |

* cited by examiner

Primary Examiner — Jennifer L. Doak

(57) ABSTRACT

This invention relates to autostereoscopic display assemblies, in particular for hand-held devices such as tablets, i-Pads, mobile phones, etc., wherein a stereoscopic effect is achieved by forming light beams are emitted from the display at different angles and with different polarization. The display assembly comprises a sandwiched structure consisting of a light-guide panel and a modified liquid-crystal display that is applied onto the light-guide panel. The panel has on its outer surface a net of light waveguides for delivery of light from the light source and for uniform distribution of light over the entire surface of the display. The different polarizations and angular directions of the beams perceived differently by a viewer's left and right eyes are achieved by providing the light-distribution waveguides with holograms of two different types.

5 Claims, 10 Drawing Sheets

AUTOSTEREOSCOPIC DISPLAY ASSEMBLY BASED ON DIGITAL SEMIPLANAR HOLOGRAPHY

FIELD OF THE INVENTION

This invention generally relates to autostereoscopic display systems, in particular, to an autostereoscopic display that uses two light beams of different directions to achieve a stereoscopic effect. The invention may find application for displays of hand-held devices such as tablets, i-Pads, mobile phones, etc.

BACKGROUND OF THE INVENTION AND DESCRIPTION OF THE PRIOR ART

A three-dimensional display of images based on stereoscopy is well known in the art but in a majority of cases the stereoscopic viewing of three-dimensional (3D) images requires use of special eye wear and display equipment. Although this technique is well suitable for use in movie theaters and on TV sets with big screens, it is inconvenient for viewing 3D images on hand-held devices such as mobile phones, i-Pads, etc. For example, US Patent Application Publication 20110255160 (Myoung-jun Lee, et al) discloses 3D glasses, a 3D display apparatus, and a charging system for 3D glasses. The 3D glasses, which operate in association with a 3D display apparatus, includes an interface unit which is configured to connect to the 3D display apparatus and through which power is transmittable; a battery unit which supplies power to the 3D glasses; and a charging unit which is connected to the interface unit and the battery unit and which receives power input from the interface unit and charges the battery unit using the input power.

Also known in the art are autostereoscopic 3D displays that are advantageous over the aforementioned 3D displays in that no special glasses are needed to view the images that produce the illusion of depth. The 3D images generated by autostereoscopy are the result of a simulated parallax effect produced by a range of multiple viewing angles.

For example, US Patent Application Publication 20110175906 (Huabing Zheng, et al) discloses a 3D display system for displaying a 3D image. The 3D image includes at least a first image and a second image with a parallax between the first image and the second image. The 3D display system includes a display device and a liquid-crystal lens array. Further, the display device is configured to display at least two combined images of the 3D image in a single display period, and each of the two combined images includes a part of the first image and a part of the second image. The liquid-crystal lens array has a plurality of lens units configured to separate a part of the first image and a part of the second image in each of the two combined images into predetermined viewing directions, respectively, such that a complete first image and a complete second image are displayed without loss of resolution. Voltages are applied to the "n" number of strip electrodes, and these voltages may have gradually changing values that correspond to rotation angles of liquid-crystal molecules Known in the art are stereoscopic images obtainable from 2D images by other methods. For example, U.S. Pat. No. 8,054,329 (S. Shestak, et al) discloses a high-resolution 2D-3D switchable autostereoscopic display apparatus that includes a backlight unit that emits light; a polarizer sheet that changes the light emitted from the backlight unit so that the light has only a specific polarization direction; a polarization switch that converts the direction of the polarization of incident light; a birefringent element array comprising a plurality of alternating first and second birefringent elements that changes the polarization direction of incident light so that the polarization of light transmitted by the first birefringent elements is perpendicular to the polarization of light transmitted by the second birefringent elements; a lenticular lens sheet that separates and emits incident light to a first-eye viewing zone and a second-eye viewing zone; and a display panel that displays an image.

Another example of 2D-to-3D-image conversion is disclosed in U.S. Pat. No. 6,686,926 (Kaye) which describes the scanning of images into a computer-based system and creating, with the use of graphic image software, a 3D image that can be used for viewing and for re-recording three-dimensional viewing. The process described in this patent converts only a single image to a 3D image.

Also known is the reproduction of 3D still and dynamic images on handheld devices such as cell phones and Personal Digital Assistant devices (PDA) as well as laptop and desktop computers (see, e.g., International Patent Publication WO/2008/086049 (PCT/US2008/050025) (Haohong WANG, et al). The invention relates to reproduction of 3D video images on autostereoscopic displays. The process includes culling facets facing away from a viewer, defining foreground facets for left and right views and common background facets, determining lighting for these facets, and performing screen mapping and scene rendering for one view (e.g., right view) using computational results for facets of the other view (i.e., left view). In one embodiment, visualization of images is provided on the stereo-enabled display of a low-power device, such as a mobile phone, a computer, a video game platform, or a PDA.

Integration and display of a 3D image and a camera image in a mobile device is disclosed in U.S. App. No. 20090195539 (Kim). In this application, the processing method for the integration between the two images involves recognition of a specific image pattern defined by the user, tracing of that pattern within an image, and interfacing of a camera image and a 3D image based on tracing results. The 3D object is animated and rendered using a 3D graphic engine, and the rendered image of the 3D object and the camera image are integrated and displayed.

Holographic displays unlike stereoscopic and autostereoscopic displays provide a more realistic 3D view of the principal objects and scenery of a captured image. 3D holographic images are not well known in the art. Currently, 3D images for handheld devices such as smart phones involve synthetic creation of dynamic images that require rotation of the phone in all directions in order to observe movement of the image.

Systems and methods for creating, editing, and distributing stereoscopic images have also been disclosed in prior art. For example, International Patent Publication No. WO 0180548 describes a system and method for the registration and distribution of stereoscopically complementary pairs of images suitable for a variety of different viewing formats.

Current 3D displays use lenticular lenses or a parallax barrier. Other displays use eye-tracking systems to automatically adjust two displayed images to follow movement of the viewer's eyes.

BRIEF SUMMARY OF THE INVENTION

This invention generally relates to autostereoscopic display assemblies, in particular, to autostereoscopic display assemblies that use two different light beams emitted from a display at different angles and that reach various viewer's eyes to produce a stereoscopic effect. The invention may find application for display assemblies of hand-held devices such as tablets, i-Pads, and mobile phones.

The autostereoscopic display assembly of the invention comprises a sandwich structure that consists of a lightguide plate (LGP) and a modified liquid-crystal display (MLCD), wherein the MLCD is applied onto the LGP that is used as the source of light and a 2D-to-3D converter.

The autostereoscopic display assembly of the invention has a layered structure that comprises a rectangular transparent substrate, the surface of which is covered with a net of planar ridge waveguides. This net is used for delivering specific monochromatic lights, e.g., red, green, and blue colors, to specific points on the substrate. These specific monochromatic lights are delivered to the specific points of the substrate and are irradiated in the form of light beams emitted from the LGP in the direction of the MLCD at different angles. After interaction with the MLCD, these differently directed beams are converted into modulated beams that deliver images differently to the left and right eyes of the viewer. As a result, the viewer sees images in three-dimensional view.

Structurally, each planar ridge waveguide of the net comprises a core that may lie on a cladding layer or that is embedded into the cladding layer. The core and cladding are made from transparent optical materials that have different coefficients of refraction. Both can be made from the same materials, but these materials should have different coefficients of refraction. For example, these materials can be a pair of silicon oxides $SiO_2$ or a pair of silicon nitrides $Si_3N_4$, or combinations thereof, etc. If the cladding comprises an outer layer, it may be coated with a transparent protective film.

The system also contains light sources, e.g., red, green, and blue LEDs or lasers, that deliver light to the aforementioned net through a main or light-separation planar ridge waveguide that is located on one side of the rectangular substrate. Furthermore, the net contains a plurality of light-distribution planar ridge waveguides. These light-distribution planar ridge waveguides are combined into a set of waveguides for guiding lights of different colors that are arranged in parallel to each other. A plurality of such sets may extend across the substrate perpendicular to the light-separation planar ridge waveguide to which the plurality of sets is optically coupled. For red, green, and blue (RGB) lights, each set may comprise, e.g., a triplet that consists of parallel planar ridge waveguides for propagating red, green, and blue lights.

The core surface of each light-separation planar ridge waveguide contains a pattern of first individual light beam redirection means in the form of digital planar holograms that redirect the light of different wavelengths obtained from specific lasers into the corresponding light-distribution planar ridge waveguides. The latter, in turn, have on the surfaces of their cores a pattern of digital planar holograms that redirect a part of the light outward in both directions from the plane of the transparent substrate. The aforementioned light-distribution planar ridge waveguides are holograms of two different types. The difference between them is that they irradiate light beams at different angles to the plane of the hologram, i.e., the lights that are perceived differently with the left and right eyes of the viewer. In other words, holograms of one type irradiate lights that are seen with the left eye while holograms of another type irradiate lights that are seen with the right eye. These lights are modulated in the MLCD of the invention into optical rays that are seen by the viewer as a three-dimensional image.

In order to efficiently use the lights emitted by the holograms and to send these lights in the direction of the viewer only, the system is provided with light-redirection means in the form of a reflective coating formed between the cladding and the substrate that supports the cladding.

The thickness of the portion of the cladding between the external surface of the cladding and the core is selected so that the light emitted from the holograms and the light reflected from the reflective coating toward the substrate will propagate with a phase shift that provides positive interference.

DETAILED DESCRIPTION OF THE INVENTION

This invention generally relates to autostereoscopic display assemblies, in particular, to an autostereoscopic display assembly that uses two different light beams emitted to the viewer at different angles to achieve a stereoscopic effect. The invention may find application in display assemblies of hand-held devices such as tablets, i-Pads, mobile phones, etc.

Figure 1A:
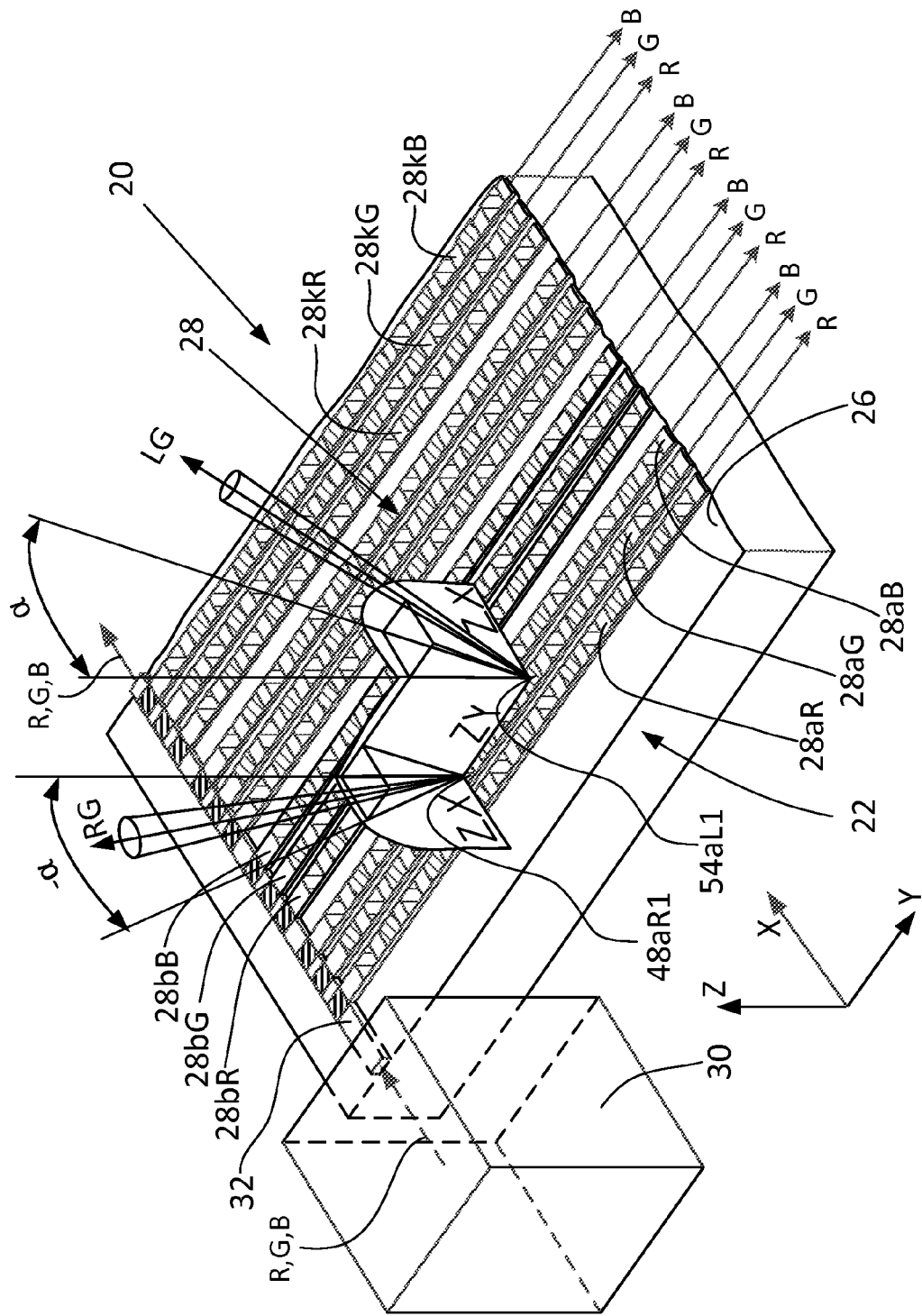
FIG. 1A is a three-dimensional view of a part of the LGP of the autostereoscopic display assembly of the invention.
Figure 1B:
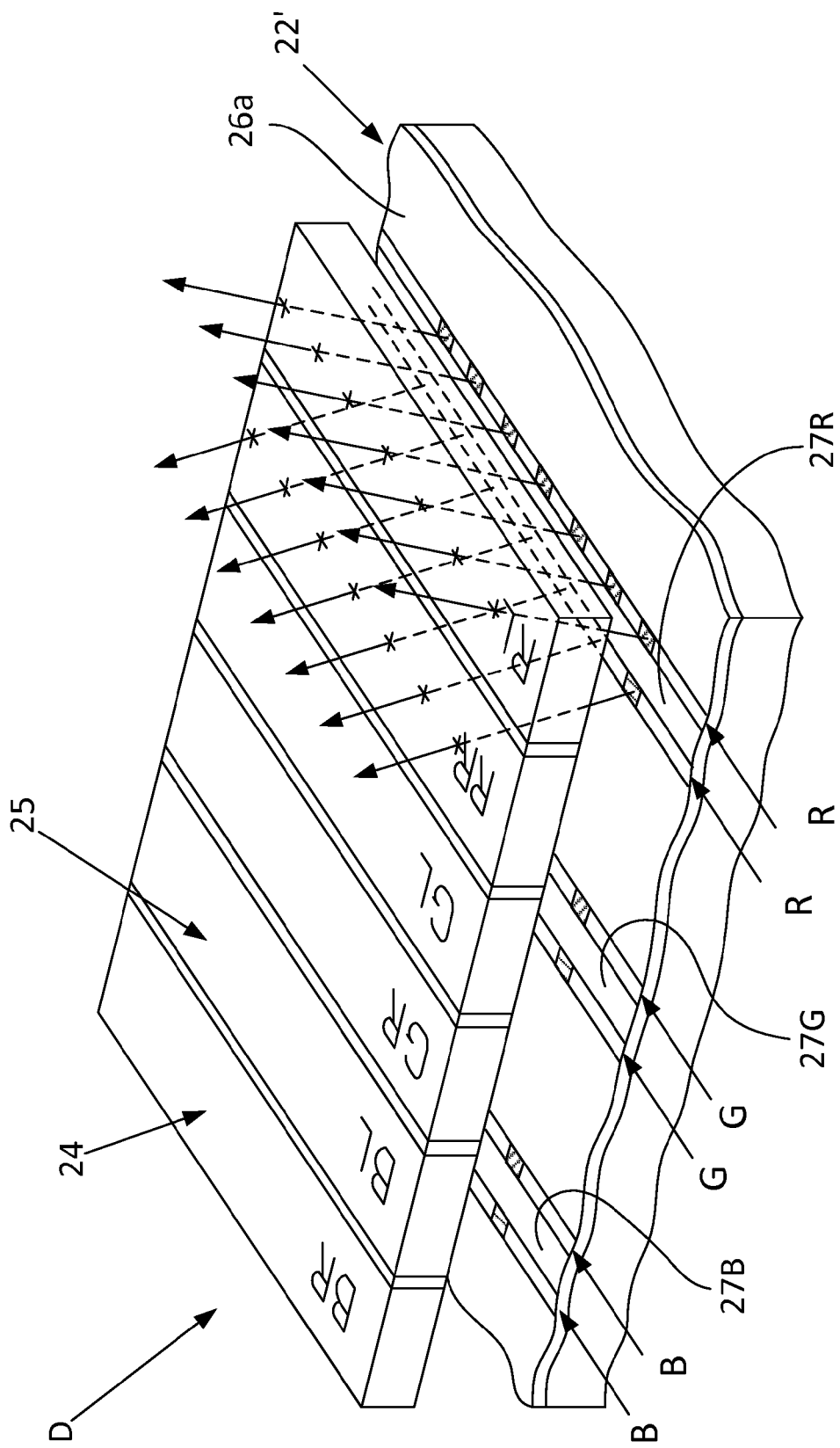
FIG. 1B is a fragmental three-dimensional view of the LGP according to another modification of the autostereoscopic display assembly of the invention in combination with a part of a modified liquid-display of the invention.

The autostereoscopic display assembly of the invention comprises a sandwich structure that consists of a lightguide plate (LGP) and a modified liquid-crystal display (MLCD), wherein the MLCD is applied onto the LGP, which is used as a source of light and a 2D-to-3D converter. FIG. 1A is a three-dimensional view of part of an LGP 20 of the autostereoscopic display assembly of the invention, and FIG. 1B is a fragmental three-dimensional view of an LGP 22' according to another modification of the autostereoscopic display assembly D of the invention in combination with part of a modified display 24 of the invention.

Figure 2A:
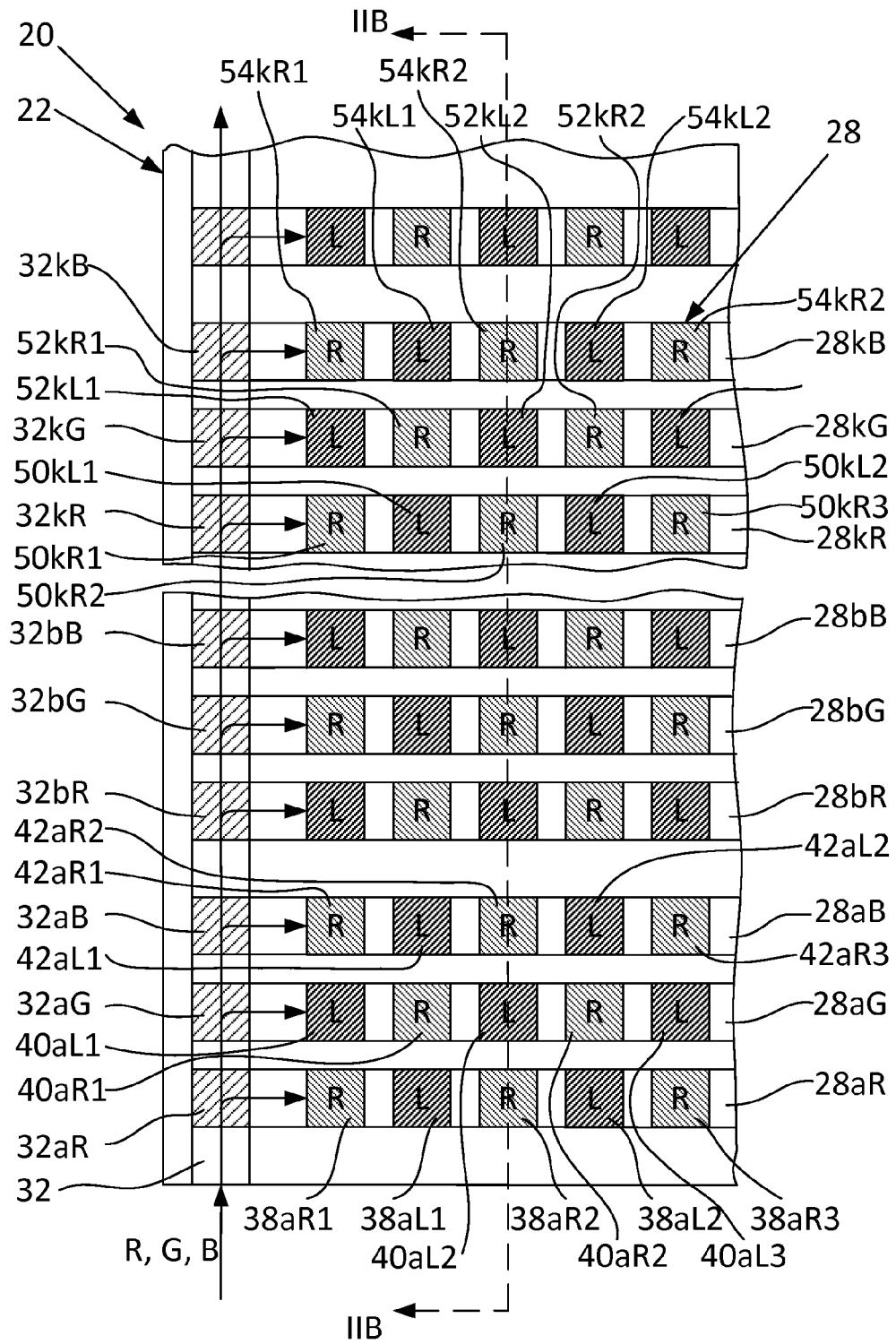
FIG. 2A is a top view of the LGP of the invention.

Let us first consider the structure of the LGP 20, which is shown in FIGS. 1A and 2A, which is a plan view of the LGP. It can be seen from these drawings that the LGP 20 comprises a rectangular transparent substrate 22, the surface of which is covered with a net 28 of light-distribution planar ridge waveguides 28aR, 28aG, 28aB, 28bR, 28bG, 28bB . . . 28kR, 28kG, 28 kB . . . that are arranged parallel to one side of the rectangular substrate 22. This net 28 is used for delivering specific monochromatic laser lights, e.g., red, green, and blue colors, to specific points on the substrate 22. Hereinafter the lights are considered to be laser lights. Though the invention is described in application to three different monochromatic lights, i.e., R, G, and B, it is equally applicable to a completely monochromatic system that operates with the light of only one wavelength. Meanwhile, specific monochromatic lights are sent to the aforementioned light-distribution planar ridge waveguides 28aR, 28aG, 28aB, 28bR, 28bG, 28bB ... 28kR, 28kG, 28kB ... from the respective red, green, and blue laser light sources, which are shown in FIG. 1A in the form of a cube designated by reference numeral 30. From the light source 30, lights are delivered to the light-distribution planar ridge waveguides 28aR, 28aG, 28aB, 28bR, 28bG, 28bB ... 28kR, 28kG, 28kB ... through at least one main light-separation planar ridge waveguide 32 that is arranged perpendicular to the light-distribution planar ridge waveguides parallel to the other side of the rectangular substrate 22. The main light-separation planar ridge waveguide 32 is optically coupled with light-distribution planar ridge waveguides 28aR, 28aG, 28aB, 28bR, 28bG, 28bB ... 28kR, 28kG, 28kB ... by means of a plurality of sequentially arranged 45° planar Bragg-grating holograms 32aR, 32aG, 32aB, 32bR 32bG, 32bB ... 32kR, 32kG, 32kB ... which are shown in FIG. 2A. A detailed description of these 45° planar Bragg-grating holograms is omitted from the present specification since they are beyond the scope of the present invention and comprise the subject of pending U.S. patent application Ser. No. 13/317,544 filed in Oct. 21, 2011 by the same applicants.

Figure 2B:
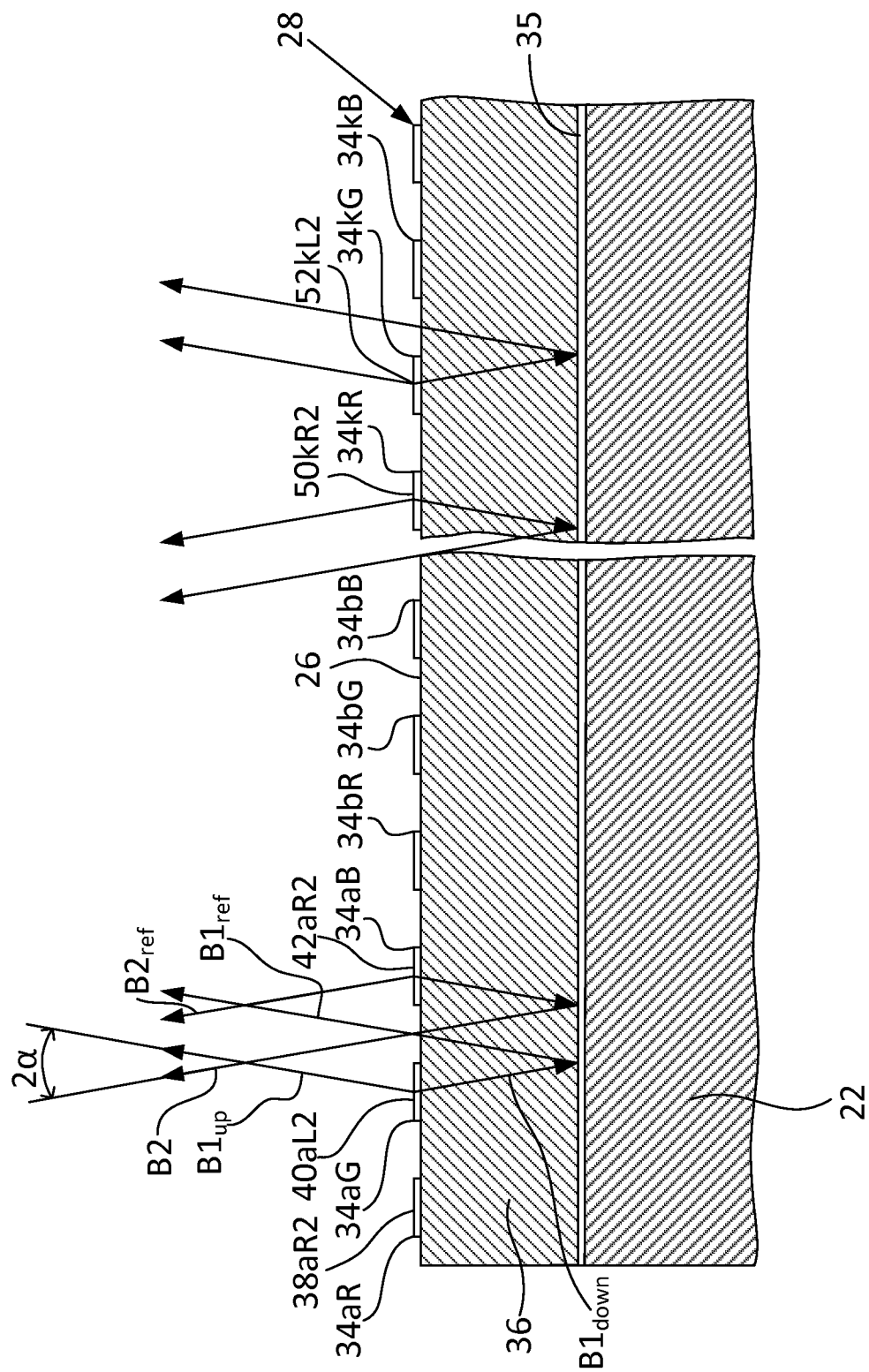
FIG. 2B is a sectional view along line IIB-IIB of FIG. 2A.
Figure 2C:
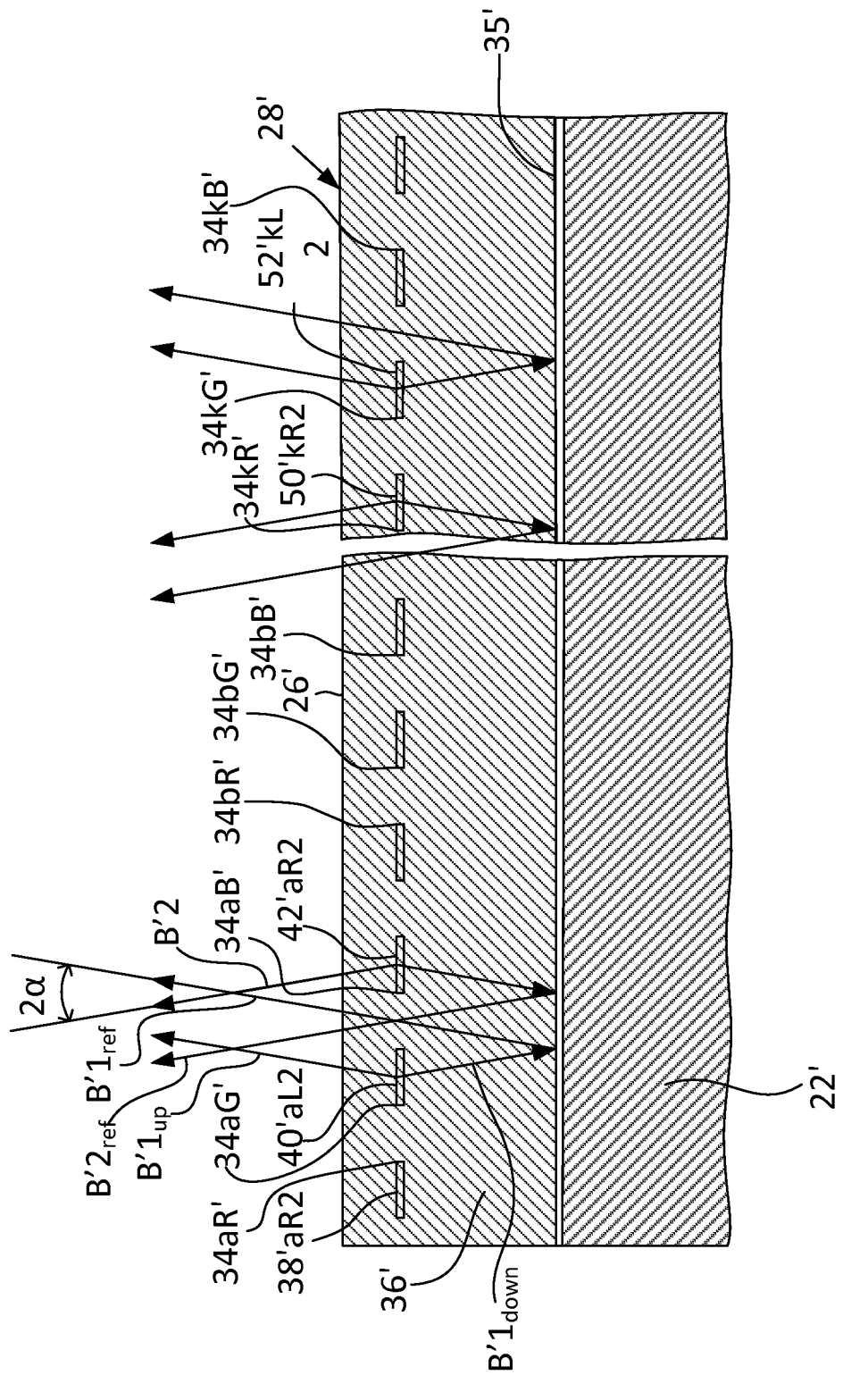
FIG. 2C is a sectional view of the LGP similar to FIG. 2B but for another modification of the invention where the cores are embedded into a common cladding.

As shown in FIG. 2B, which is a sectional view along line IIB-IIB of FIG. 2A, structurally light-distribution planar ridge waveguides of the net 28 comprise cores 34aR, 34aG, 34aB, 34bR, 34bG, 34bB ... 34kR, 34kG, 34kB ... which may lie on a common cladding layer 36 or which may be embedded into the cladding (see FIG. 2C, where components of the LGP of the invention that are similar to those of the modification shown in FIG. 2B are designated by the same reference numerals with addition of the prime symbol, i.e., 34aR', 34aG', etc.). The cores 34aR, 34aG, 34aB ... and cladding 36 are made from transparent optical materials that have different coefficients of refraction. Both can be made from the same materials, but these materials should have different coefficients of refraction. For example, these materials can be a pair of silicon oxides $SiO_2$ or a pair of silicon nitrides $Si_3N_4$, etc. If necessary, an upper cladding may be provided and coated with a transparent protective film (not shown).

Topologies of the net and of the light supply system, which are described above and shown in FIGS. 1, 2A, 2B, 2C, and 3, are given as examples because many other modifications are possible without departing from the scope of the present invention.

In contrast to the light-distribution planar ridge waveguides of pending U.S. patent application Ser. No. 13/317,544, the light-distribution waveguides 28aR, 28aG, 28aB, 28bR, 28bG, 28bB ... 28kR, 28kG, 28kB ... (FIGS. 1A and 2A) of the invention not only redirect a part of the light outward in both directions from the plane of the transparent substrate 22 (FIG. 1A), but also have holograms of two different types, i.e., a first type and a second type. Holograms of the first type and the second type differ in that they irradiate lights of different directions, i.e., lights that are perceived differently with the left eye and with the right eye of the viewer.

The difference in the angles and directions of the beams irradiated from the holograms of the first type and of the second type that are intended for perception by the left eye and the right eye of the viewer (FIG. 4) is illustrated in FIG. 1A, where the light beams are shown as conical bodies RG and LG (i.e., the right green and the left green light beams).

Only two beams having different directions and angles are shown in the drawings in order not to complicate the drawings. It is understood that such beams are irradiated from each pair of holograms of the first and the second types. For orientation of the beam directions relative to the LGP plane, FIG. 1A contains an XYZ coordinate system, where the LGP plane that contains the net 28 of the light-distribution waveguides, and, hence, of the holograms, coincides with the X-Y plane; the light-distribution waveguides 28aR, 28aG, 28aB, 28bR, 28bG, 28bB ... 28kR, 28kG, 28kB ... (FIGS. 1A and 2A) are parallel to the Y-axis; and the at least one light-separation waveguide 32 is parallel to the X-axis. It can be seen from FIG. 1A that the beams RG and LG are inclined to the ZY plane at angles $-\alpha$ and $+\alpha$, respectively. It can also be seen that the beams RG and LG are inclined from the plane ZX toward the direction of the propagation of the light in the waveguides.

Figure 4:
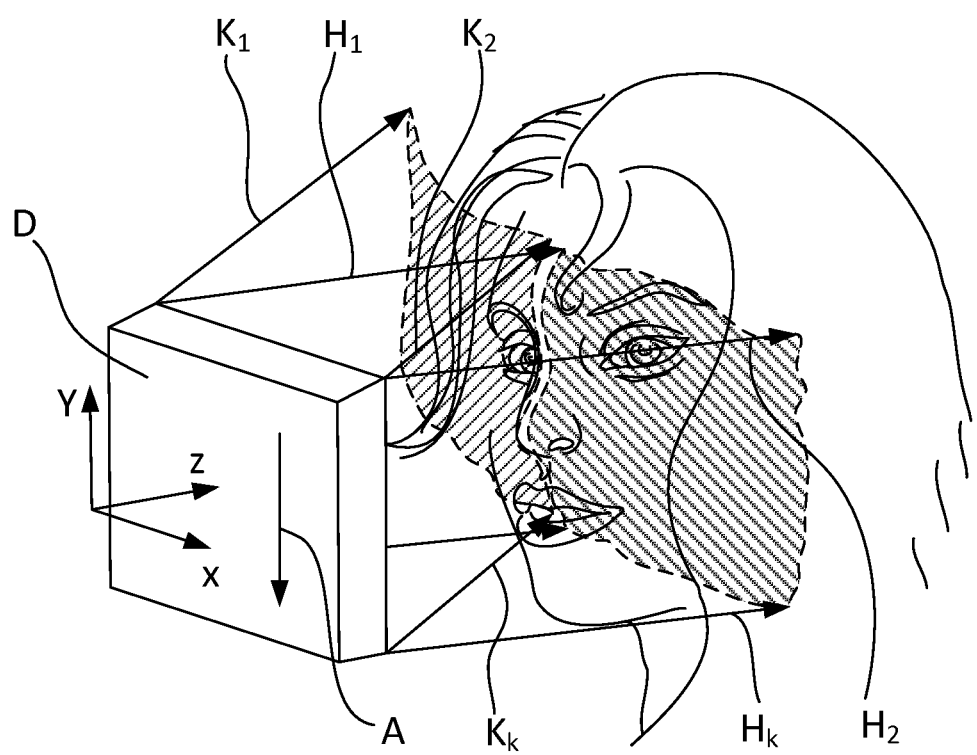
FIG. 4 is a three-dimensional view illustrating orientation of the display assembly relative to the eyes of the viewer.

The terms "right" (R) and "left" (L) used in the present specification are determined by a right or left angular deviation of the beam emitted from a hologram from the plane perpendicular to the plane of the LGP. It is understood that the terms "right" and "left" are defined by the orientation of the LGP with respect to the viewer. In order to unequivocally link these directions with the deflections of the light beams, it is necessary to link the left and right directions of the beams with the direction of propagation of the light along the light-distribution ridge waveguides 28aR, 28aG, 28aB, 28bR, 28bG, 28bB ... 28kR, 28kG, 28kB .... Since in the autostereoscopic display assembly D (FIG. 1B) of the invention the light exits the main light separation ridge waveguide 32 (FIGS. 1A, 2A, 2B) in the Y-axis direction (FIG. 1A), the hologram emitting the light (for example, the beam RG) and deflecting said beam from the Z-X plane by angle $-\alpha$ (FIG. 1A) is considered "right" and correspondingly marked by an index R. Following the same rule, the hologram deflecting the light from the Z-X plane by angle $\alpha$ is referred to as "left" and marked by the index L. Index G in RG, LG designates "green" because the waveguide 28aG is used for transmitting green light. Correspondingly, beams emitted by the holograms located at the waveguides transmitting red and the blue lights and deflecting them in the way described above will also bear the indexes R and L. Eventually, the right and left direction of the beam deviation depends on the direction of propagation of the light in the waveguide. Hence, it is clear that if the autostereoscopic display assembly D of the current invention is placed in front of the viewer's eyes and if the light propagates from the top to the bottom of the display assembly D (as shown by the arrow A in FIG. 4, which is a three-dimensional view illustrating orientation of the display assembly D relative to the eyes of the viewer), the "right" set of rays will enter the left eye, and the "left" set of rays will enter the right eye. In the following part of the specification, it will be assumed that the autostereoscopic display assembly D is oriented with respect to the viewer's eyes, as shown in FIG. 4.

It can be seen that the right eye perceives the rays $K_1$, $K_2 ... K_k ...$ irradiated from the display D in one direction and that the left eye perceives the rays $H_1, H_2 ... H_k ...$ irradiated from the display D in another direction.

In other words, as can be seen from FIG. 2A, each of the light-distribution waveguides 28aR, 28aG, 28aB, 28bR, 28bG, 28bB ... 28kR, 28kG, 28kB ... (FIGS. 1 and 2A) contains a sequence of alternating holograms (1) of the first type, which are intended for perception with the left eye of the viewer and are designated by letter R, and (2) of the second type, which are intended for perception with the right eye of the viewer and are designated by letter L. The choice of letter R for the left eye and of letter L for the right eye is derived from the fact that the holograms of the first type irradiate light from the LGP plane at a first angle directed toward the left eye, and the holograms of the second type irradiate light from the LGP plane at a second angle directed toward the right eye.

These lights are modulated in the MLCD 24 (FIG. 1B) of the invention into optical rays that are seen by the viewer as a three-dimensional image.

Holograms of the first and second type are shown in FIG. 2A and are designated by reference numerals 38aR1, 38aL1, 38aR2, 38aL2, 38aR3 . . . 40aL1, 40aR1, 40aR2, 40aL3 . . . 42aR1, 42aL1, 42aR2, 42aL2, 42aL3 . . . 50kR1, 50kL1, 50kR2, 50kL2, 50kR3 . . . , and so forth.

In fact, the image shown in FIG. 1B depicts one pixel 25 of the display 24. In the illustrated example, this one pixel 25 is composed of six subpixels which are designated by symbols RL (red-left), RR (red-right), GL (green-left), GR (green-right), BL (blue-left), and BR (blue right) and are intended for generation of color image elements composed of pixels, such as pixel 25.

Figure 3:
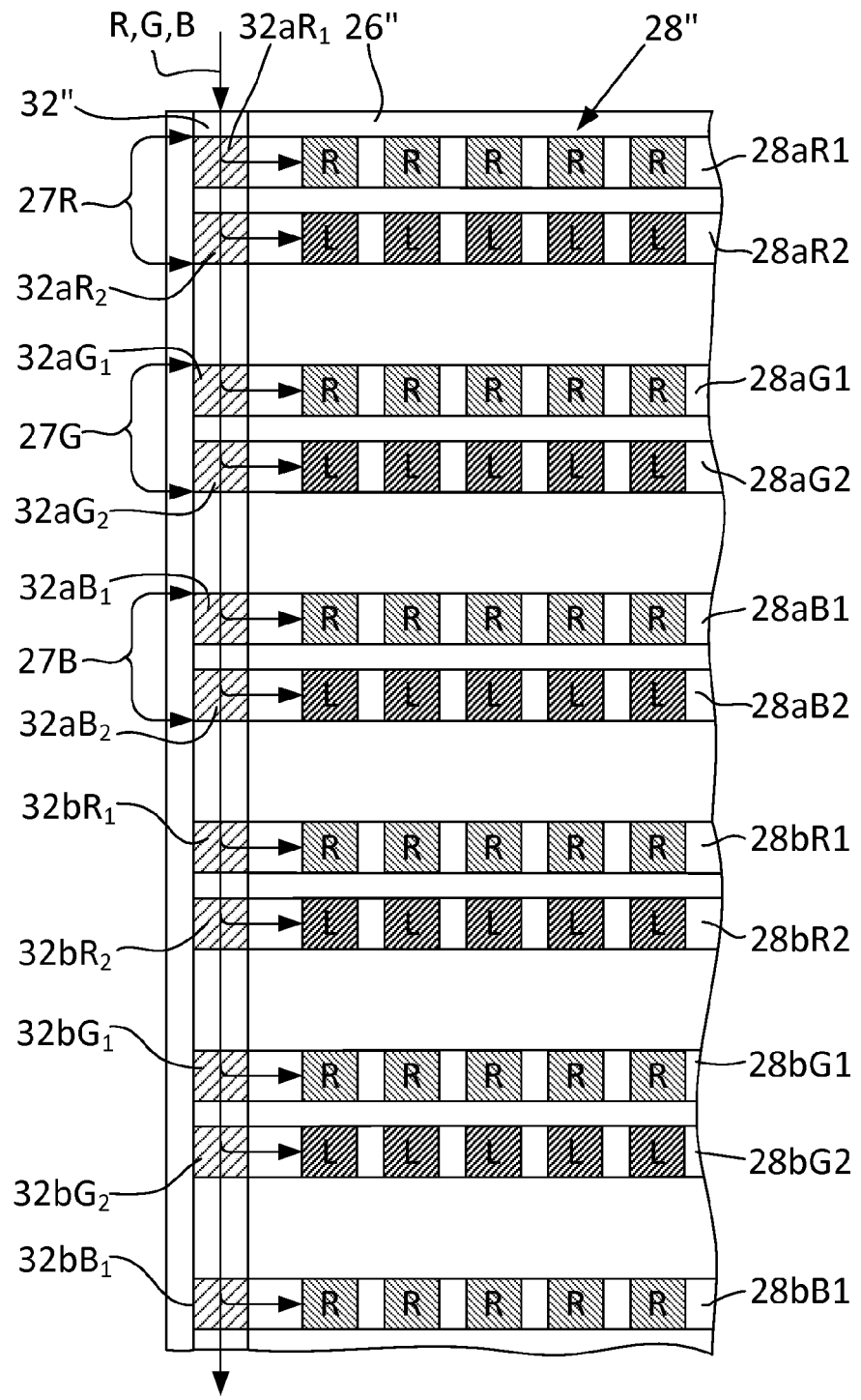
FIG. 3 is a plan view of the LGP, a fragment of which is shown in FIG. 1B in a three-dimensional view.

In FIG. 1B, reference numeral 24 designates the LCD of the invention. As mentioned above, topologies of the net and light supply system are shown in FIGS. 1, 2A, 2B, 2C, and 3 as examples in which the light-distribution planar ridge waveguides 28aR, 28aG, 28aB, 28bR, 28bG, 28bB . . . 28kR, 28kG, 28kB . . . (FIGS. 1 and 2A) are shown combined into triplets, where each triplet comprises one red, one green, and one blue light-distribution waveguide. It is understood that the RGB light-distribution planar ridge waveguides may be combined in many other sets. Thus, in FIG. 1B, a triplet of the light-distribution waveguides comprises three pairs of monochromatic light-distribution planar ridge waveguides 27R, 27G, and 27B, and each pair contains two waveguides for distribution of lights of the same color, i.e., RR, GG, and BB, respectively. Many other geometrical positions and combinations of monochromatic light-distribution waveguides on the surface of the substrate are possible within the scope of the invention and within the limits of presentation by RGB color image reproduction with use of the LCD matrix in the LCD display. The topology shown in FIG. 1B is also shown in FIG. 3 as a plan view.

The same is true not only for the monochromatic light-distribution waveguides but also for holograms in these waveguides. For example, topology of the net 28" shown in FIG. 3 corresponds to one shown in FIG. 1B, where the light-distribution waveguides 28aR1, 28aR2, 28aG1, 28aG2, 28aB1, 28aB2, 28bR1, 28bR2, 28bG1, 28bG2, 28B1 . . . of the same colors are combined into pairs 27R, 27G, 27B, . . . and where each waveguide contains holograms R-R-R- . . . of one type only. For example, the waveguide 28aR1 of the pair 27R may contain holograms for emitting light perceived by the left eye, and the adjacent waveguide 28aR2 of the same pair 27R may contain holograms L-L-L . . . for emitting light perceived the right eye. The same is true for waveguide pairs 27G and 27B that transmit light of different colors that are obtained from holograms $32aR_1$, $32aR_2$ for the red-light waveguides, from holograms $32aG_1$, $32aG_2$ for the green-ight waveguides, from holograms $32aB_1$, $32aB_2$ for the blue-light waveguides, from holograms $32bR_1$, $32bR_2$ for the red-light waveguides, from holograms $32bG_1$, $32bG_2$ for the green-light waveguides, from holograms $32bB_1$, $32bB_2$ for the blue-light waveguides, etc. On the other hand, in the topology of the aforementioned FIG. 2A, holograms of the first and second types are arranged in each light-distribution waveguide in an alternating order such as R-L-R-L-R-L . . . . Moreover each R and each L hologram of each light-distribution waveguide also alternate with the aligned hologram of the neighboring waveguide. In other words, as shown in FIG. 2A, the hologram 38aR1 of the waveguide of the first type is aligned with the position of the hologram 40aL1 of the waveguide of the second type, etc.

In order to efficiently use light emitted by the holograms and to send this light in one direction, the system is provided with light-redirection means in the form of a reflective coating 35 or 35' (FIG. 2B and FIG. 2C) formed between the cladding 36 or 36' and the substrates 22 and 22' which support the claddings.

The thickness of the portion of the cladding 36 (FIG. 2B) between the external surface of the cladding 36 and the core, e.g., 34aG, is selected so that the light emitted from the holograms, e.g., such as 40aL2, and the light (beam $B2_{ref}$) reflected back from the reflective coating 35 through the cladding 36 and out of the system will propagate with a phase shift relative to the beam $B1_{up}$ which provides positive interference. Change of the phase in reflection of the beam $B1_{down}$ from the reflective coating 35 should be taken into consideration, if necessary.

The same condition exists in the modification of FIG. 2C, except that only the part of the cladding 36' that is located under the embedded cores is taken in consideration.

Now let us consider holograms in more detail. The hologram for right or left eyes, such as, e.g., the holograms 38aR1 and 38aL1 shown in FIG. 2A, respectively, exhibits mirror symmetry. The angular deviation (FIG. 1A) of each beam by angle α or −α depends on specific pattern of the holograms.

Figure 5A:
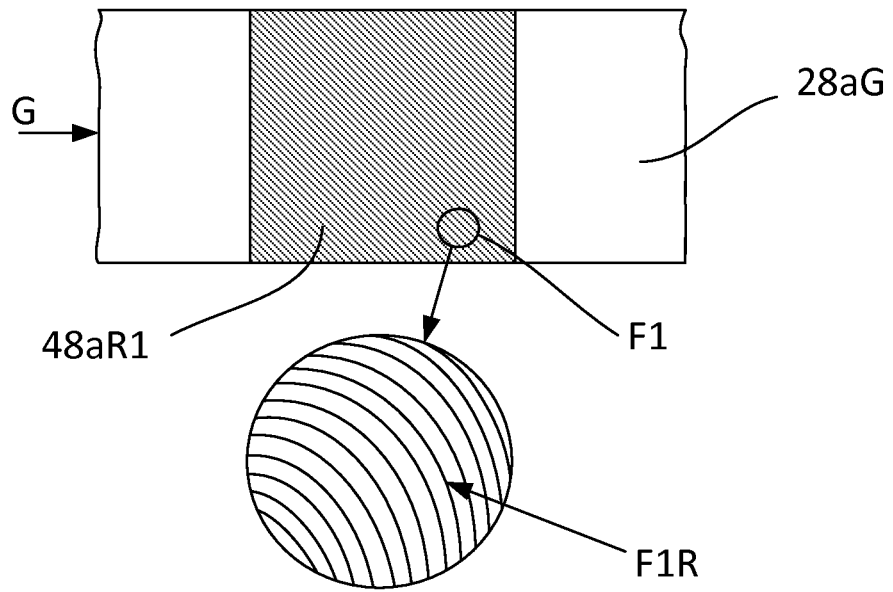
FIG. 5A shows a part of the waveguide of the invention with one "right-eye" hologram.

FIG. 5A shows a part of the waveguide 28aG and one hologram 48R1 (FIG. 1). The area F1 shown below the hologram illustrates the hologram pattern on a larger scale. Each hologram consists of a plurality of holographic elements, which in the example of FIG. 5A comprise continuous curves F1R of the second order.

Figure 5B:
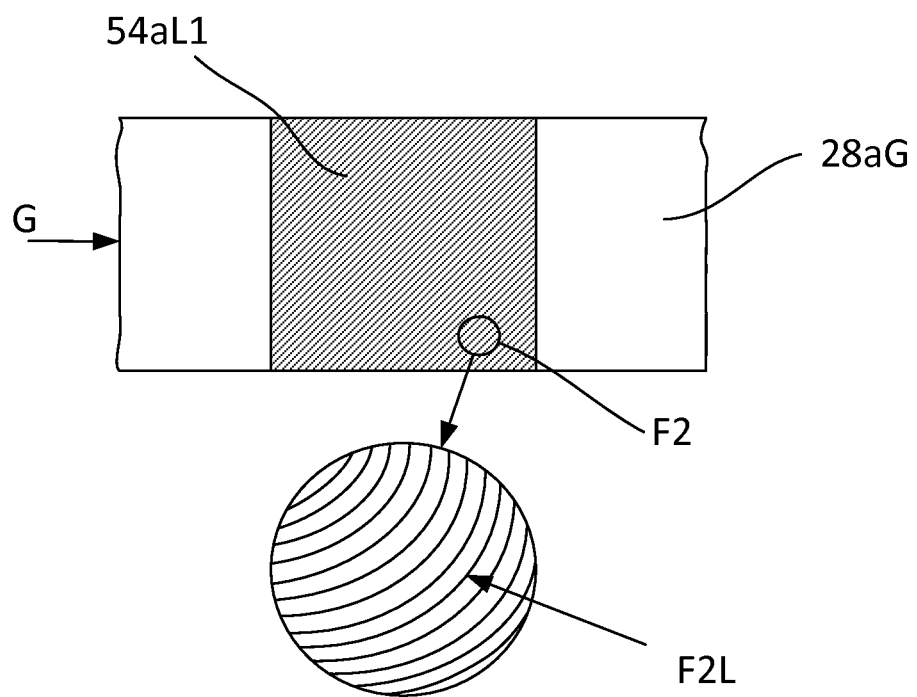
FIG. 5B shows a part of the waveguide of the invention with one "left-eye" hologram.

FIG. 5B shows a part of the waveguide 28aG with one hologram 54aL1 (FIG. 1). The area F2 shown below the hologram illustrates the hologram pattern on a larger scale. Each hologram consists of a plurality of holographic elements, which in the example of FIG. 5B comprise continuous curves F2L of the second order.

Figure 6A:
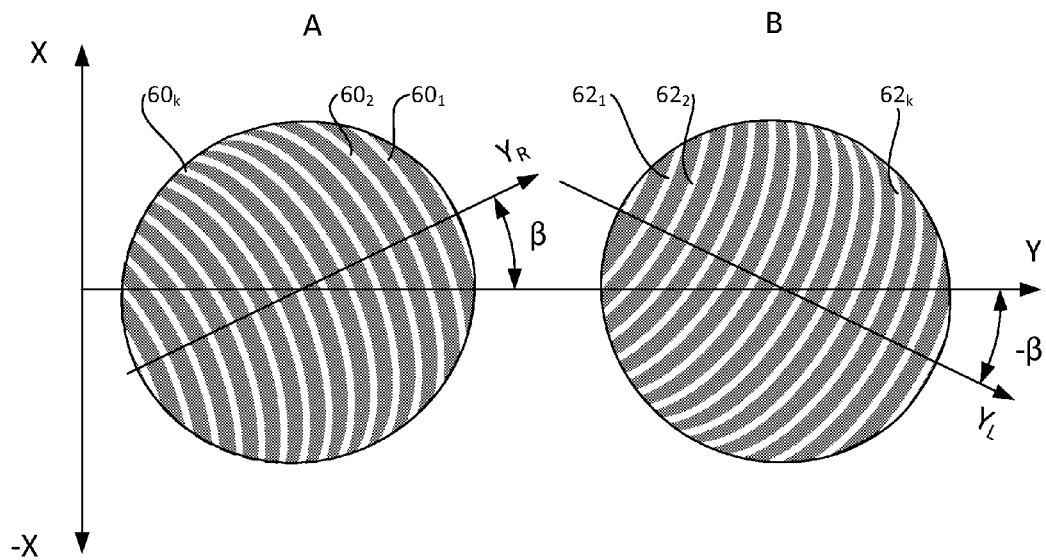
FIGS. 6A to 6D show orientation of the holographic elements of the "right" and "left" holograms with respect to the light-distribution planar ridge waveguides and hence relative to the coordinate system XYZ shown in FIG. 1.
Figure 6B:
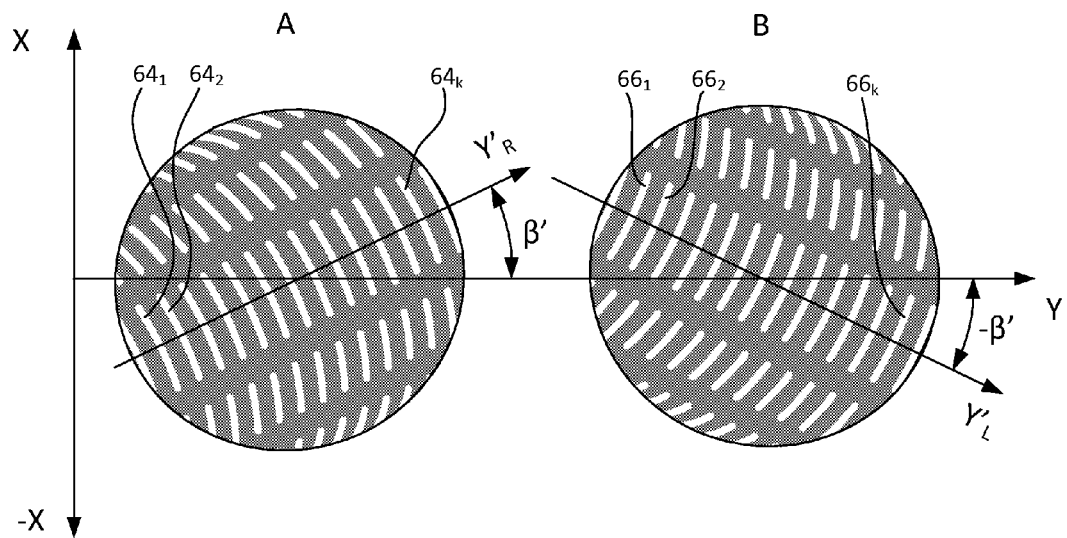
Figure 6C:
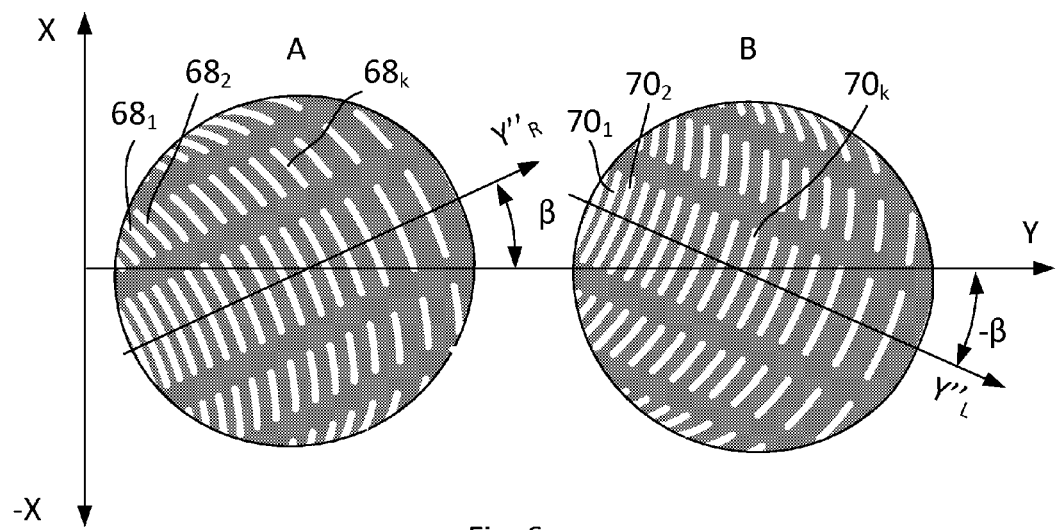
Figure 6D:
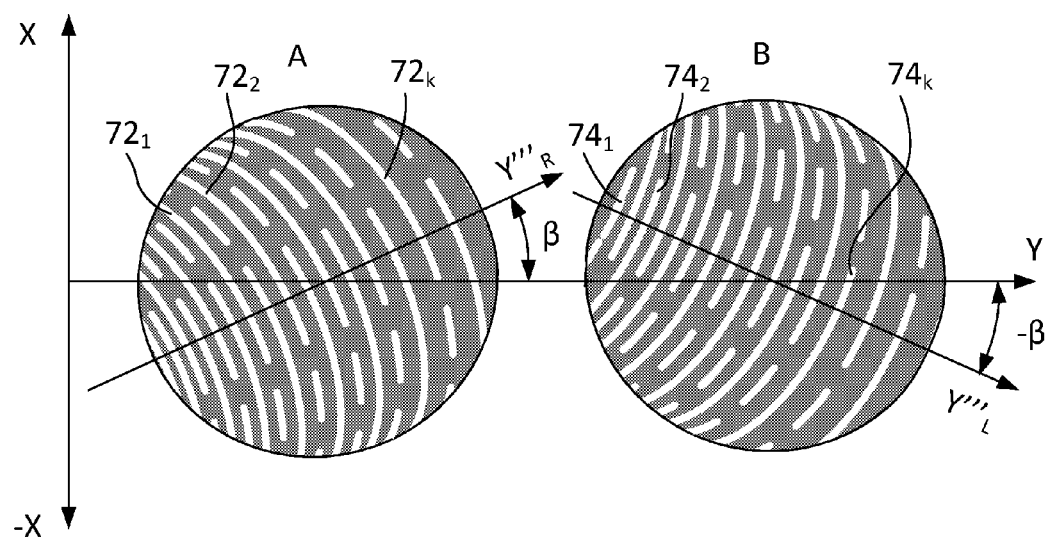

FIGS. 6A to 6D show orientation of holographic elements of the "right" and "left" holograms with respect to the light-distribution planar ridge waveguides 28aR, 28aG, 28aB, 28bR, 28bG, 28bB . . . 28kR, 28kG, 28kB . . . (FIG. 2) and, hence, relative to coordinate system XYZ (FIG. 1A). In all drawings, images designated by (A) relate to "right" holograms, and images designated by (B) relate to "left" holograms. Since all holograms are located in the XY-plane, the coordinate system shown in FIGS. 6A to 6D also lies in the XY-plane which corresponds to the XY-plane of the coordinate system XYZ shown in FIG. 1. FIGS. 6A to 6D are fragmental views of the type designated by symbols F1 and F2 in FIGS. 5A and 5B. The patterns of holograms have symmetry axes $Y_R$, $Y_L$ (FIG. 6A), $Y'_R$, $Y'_L$ (FIG. 6B), $Y''_R$, $Y''_L$ (FIG. 6C), and $Y'''_R$, $Y'''_L$ (FIG. 6D). Depending on the type of hologram (right or left), the symmetry axes $Y_R$, $Y_L$ (FIG. 6A), $Y'_R$, $Y'_L$ (FIG. 6B), $Y''_R$, $Y''_L$ are inclined to axis Y by angles β or −β, respectively. These angles may vary in the range of 5° to 45°. In first approximation, the values of angles β and −β determine the angular deviations α and −α of light beams RG and LG (FIG. 1), where α and −α may vary in the range of 10° to 60°.

Curvatures of the holographic elements, such as, e.g., of elements F1R and F2L which are shown in FIGS. 5A and 5B and which are also shown but not designated in FIGS. 6A to 6D, determine diversions of the beams RG and LG emitted from respective holograms. The curvature of each holographic element provides divergence of the beam emitted from this holographic element and has a value that provides complete coverage of the area of the respective LGP pixel with the light spot of the projected beam.

FIGS. 6A to 6D also show various topologies of holographic elements in the respective holograms. The topology, design, shapes, and dimensions of the holographic elements shown in FIGS. 6A to 6D are described in more detail in pending U.S. patent application Ser. No. 13/317,544 filed Oct. 21, 2011 by the applicants of the present patent application, which is entitled "Light-Guide Panel for Display with Laser Backlight".

The holographic elements shown in FIGS. 5A to 6D can be manufactured by methods of high-resolution microlithography suitable for manufacturing optical devices based on digital planar holography or nano imprinting lithography.

The procedure of manufacturing digital planar holograms is described in detail in U.S. Pat. No. 7,872,788 issued Jan. 18, 2011 to one of the applicants and is entitled "Method of Digitally Processing Optical Waves in Integrated Planar Optical Devices that Operate on the Principle of Digital Planar Holography". Although this procedure was developed for the design of planar optical devices, it can be equally employed for the design of semiplanar optical devices where, similar to the device of the present invention, the light goes out of plane of the digitally processing optical waves. Therefore, it would be advantageous to repeat some aspects of the aforementioned method.

Digital planar holography advantageously combines the possibility to write an arbitrary hologram with a long light path inside the hologram. The most recent technological obstacle was a good-quality blank planar waveguide. The waveguide must be approximately one micron thick, transparent, and uniform in order to transmit light without distortion. The last-mentioned condition was the most limiting, but the optical industry resolved the problem by making arrayed waveguide gratings for optical fiber communication devices. After the problems associated with fabrication of subwavelength patterns were solved due to the progress in modern microlithography, only one problem remained, i.e., determining the pattern to be written in order to manufacture a workable device.

Determining the positions of holographic fringes is possible by means of calculations. If the shape of the planar structure is known, as well as the positions of the input and output light beams, the finding of holographic pattern coordinates is reduced to the solution of an inverse problem of finding a part of the boundary conditions based on known functions $f_{in}(x, y, \omega)$ and $f_{out}(x, y, \omega)$, the structures, shapes, and positions of which have been calculated and which have never existed in reality as optical objects and which are then reproduced by methods of microlithography in the form of actual planar objects.

The approach of the planar holography method is to characterize a hologram by Fourier components $f_{in}(x, y, \omega)$ and $f_{out}(x, y, \omega)$ of incoming and outgoing waves and then to use these functions for calculating a desirable holographic pattern. While real holograms are three-dimensional, using a two-dimensional Hamiltonian model averaged over the third dimension should be satisfactory for many applications. Since waves propagate freely in a blank waveguide, it becomes possible to write interaction in the form of a Hamiltonian model. Since nonlinear wave scattering can be neglected so that the Hamiltonian model can be presented as quadratic with respect to wave amplitude, we can assume linearity with respect to variations of the effective refraction index. Thus, the Hamiltonian model can be written as follows:

$$H_{int} = \int f(x, y, \omega) \Delta n(x, y) f(x, y, \omega) d\omega,$$

where $f(x, y, \omega)$ is the total wave function of specified frequency. Since all three functions under the integral sign are oscillating, interaction is determined by resonances. In order to transform $f_{in}(x, y, \omega)$ into $f_{out}(x, y, \omega)$, one must create variation of the effective refraction index, in arbitrary units, in the following form:

$$\Delta n(x, y) = \int f_{in}(x, y, \omega) f_{out}(x, y, \omega) d\omega$$

Many variations of this method are possible to those skilled in the art. Some variations include correcting the above formula for variation of $f_{in}(x, y, \omega)$ and $f_{out}(x, y, \omega)$ created by the hologram. To facilitate manufacturing, the function $\Delta n(x, y)$ should be substituted by binary (two-level) functions, preferably a composition of similar or identical elements. In other words, it is necessary to replace the continuous function $\Delta n = \Delta n(x, y)$ by the discrete function $\Delta n'(x, y)$.

This procedure can be formulated as follows:

$$f_{in}(x, y, \omega) \cong \sum_{n,u} C_{nu} \exp(ik_n r_u) f(\omega)$$

$$f_{out}(x, y, \omega) \cong \sum_{m,v} C_{mv} \exp(-ik_m r_v) f(\omega)$$

where $k_n$ is the wave vector of an incoming wave, and $r_u$ is the distance from the incoming port number u to a current point; $k_m$ is the wave vector of an outgoing wave, and $r_v$ is the distance from the outgoing port number v to the current point. According to the above method, digitization of planar holography consists of replacing the continuous functions $f_{in}(x, y, \omega)$ and $f_{out}(x, y, \omega)$ by finite numbers ("n" and "m") of values as a result of expansion into the Fourier series. This expansion is used for replacing $f_{in}(x, y, \omega)$ and $f_{out}(x, y, \omega)$ in the aforementioned formula $$\Delta n(x, y) = \int f_{in}(x, y, \omega) f_{out}(x, y, \omega) d\omega.$$

It is clear that instead of a continuous function $\Delta n = \Delta n(x, y)$, we will obtain a discrete number of values of $\Delta n'$ associated with predetermined coordinates that determine positions of the pattern elements of the holographic pattern.

In order to simplify production of the planar digital structure, in the aforementioned calculations, variation of the effective refractive index $\Delta n(x, y)$ can be approximated by a two-level binary function to form the pattern elements of the holographic pattern, e.g., as rectangular grooves. In FIGS. 6A, 6B, 6C, and 6D, patterns of the holograms are shown as curvilinear white strips designated by reference numerals $60_1, 60_2 \ldots 60_k, 62_1, 62_2 \ldots 62_k \ldots 64_1, 64_2 \ldots 64_k \ldots 66_1, 66_2 \ldots 66_k \ldots 68_1, 68_2 \ldots 68_k, 70_1, 70_2 \ldots 70_k \ldots 72_1, 72_2 \ldots 72_k \ldots 74_1, 74_2 \ldots 74_k \ldots$ and so forth.

Physically, these patterns comprise curvilinear lines formed from a plurality of discretely arranged rectangular grooves produced in the cores 34aR, 34aG, 34aB, 34bR, 34bG, 34bB ... 34kR, 34kG, 34kB ... of the net 28 (FIG. 2B). The aforementioned elements of the pattern may also be made in the form of dielectric stripes, recesses, projections, etc., or any other elements that can be produced by optical, e-beam, or other types of microlithography or by nanoimprinting. Longitudinal dimensions of pattern elements $60_1, 60_2 \ldots 60_k, 62_1, 62_2 \ldots 62_k \ldots 64_1, 64_2 \ldots 64_k \ldots 66_1, 66_2 \ldots 66_k \ldots 68_1, 68_2 \ldots 68_k, 70_1, 70_2 \ldots 70_k \ldots 72_1, 72_2 \ldots 72_k \ldots 74_1, 74_2 \ldots 74_k \ldots$, and so forth, may be in the range from fractions of microns to dozens of microns. Transverse dimensions may range from a fraction of a micron to several microns. It is understood that these ranges are given only as examples.

In operation, pattern elements $60_1, 60_2 \ldots 60_k, 62_1, 62_2 \ldots 62_k \ldots 64_1, 64_2 \ldots 64_k \ldots 66_1, 66_2 \ldots 66_k \ldots 68_1, 68_2 \ldots 68_k, 70_1, 70_2 \ldots 70_k \ldots 72_1, 72_2 \ldots 72_k \ldots 74_1, 74_2 \ldots 74_k \ldots$ (FIGS. 6A, 6B, 6C, and 6D) control direction of propagating light, i.e., function in accordance with a given law as $\Delta n = \Delta n(x, y)$. As a result, it becomes possible to replace the continuous function of conversion of $f_{in}(x, y, \omega)$ into $f_{out}(x, y, \omega)$ by a finite and discrete number of elements of the holographic pattern, such as those shown in FIGS. 6A, 6B, 6C, and 6D, which, as described above, may be manufactured according to aforementioned methods.

It is well known that laser illumination and image systems are subject the generation of speckles. Uncontrolled micro-nonuniformities of screens or other surfaces create coherent granular structures, which diminish image sharpness. A holographic pixel, itself, creates a nonuniform coherent optical field if the hologram is not created specifically to suppress hologram speckles. For example, a simple regular grating creates diffractive fringes if scattered light is observed at different angles. In the assembly of the invention, fringed speckles may be suppressed, and the holographic pixels are controllable and may be designed with an overlapping and smooth 3D outgoing beam and 2d laser light in the waveguide. The smooth field of the beam used in the generating function guarantees a smooth outgoing beam if microlithography-induced errors are minor. Flexibility in patterns of holographic elements in the design of holograms of the invention makes it possible to suppress generation of speckles during the design stage.

In other words, each hologram of the first and second type is made with a smooth generating function that prevents generation of speckles in the image of the modified liquid-crystal (LC) display.

The size and positioning of the holograms and LC coding pixels are matched to maximize light throughput. The LC coding layer is optimized to stabilize the directions of beams projected by the holographic layer. In our case, as compared with conventional LCDs, the LCD coding pixels have doubled the amounts of subpixels ("right" and "left"). This requires changes in the LCD-coding system of the LCD matrix. Furthermore, since the light that enters the matrix is a priori polarized light, there is no need for the first polarizer, which is an indispensible part of any conventional LCD. Since each subpixel receives an assigned light (R, G, or B), there is no need for the matrix of light filters, which are also an indispensable part of any conventional LCD display. All of these features drastically simplify design and reduce the cost of the LCD display of the invention and give us the right to call it a modified liquid-crystal display, i.e., an MLCD.

The proposed invention advantageously combines convenience of existing LCD manufacturing and 3D broadcasting infrastructure with passive digital holographic beam shapers. The proposed invention differs from other holographic technology by using planar waveguides to deliver laser light to holograms.

The autostereoscopic display assembly of the invention operates as follows. The specific monochromatic laser lights, e.g., red, green, and blue lights, are delivered to specific holograms of the light-distribution planar ridge waveguides from the laser light sources through the main planar ridge waveguide. These specific holograms are of two different types that irradiate lights that have different directions and are emitted at different angles to the plane of the substrate. Consequently, after interaction with the MLCD, these differently directed beams are converted into modulated beams that deliver images differently for perception with the left eye and right eye of the viewer. As a result, the viewer sees the image in a three-dimensional view.

Although the invention has been shown and described with reference to specific embodiments, it is understood that these embodiments should not be construed as limiting the areas of application of the invention and that any changes and modifications are possible provided that these changes and modifications do not depart from the scope of the attached patent claims. For example, the system may operate only with one monochromatic light or with more than three monochromatic lights, e.g., with red, green, blue, and yellow. Light obtained from the light source can be separated by means other than the main planar ridge waveguide. The net of light-separation and light-distribution waveguides may have topologies other than those shown in the drawings.

The invention claimed is:

1. An autostereoscopic display assembly based on digital semiplanar holography comprising:
   light sources for generating polarized monochromatic lights of at least one color;
   a lightguide plate connected to the light sources;
   a modified liquid-crystal display applied onto the lightguide plate, wherein the modified liquid-crystal display has a matrix structure composed of a plurality of pixels wherein each pixel contains a plurality of subpixels of a first type and a second type;
   a lightguide plate comprising a substrate, a cladding on the substrate, and a core having a thickness;
   a waveguide net that is arranged on the substrate and comprises at least one main planar ridge waveguide that has light-receiving holograms; and a plurality of light-distribution planar ridge waveguides that are optically coupled with light-receiving holograms of at least one main planar ridge waveguide;
   light-distribution planar ridge waveguides containing a plurality of holograms of a first type and a plurality of holograms of a second type, wherein the holograms of the first type and the holograms of the second type emit beams that have different directions and that are emitted from the lightguide plate to the modified liquid-crystal display at different angles to the plane of the substrate so that on the modified liquid-crystal display the beams emitted from the holograms of the first type interact-with subpixels of the-first type, and the beams emitted from the holograms of the second type interact on the modified liquid-crystal display with subpixels of the second type; wherein the light-distribution planar ridge waveguide receiving a monochromatic light of at least one wavelength; wherein subpixels of the first type convert light beams obtained from the holograms of the first type into images perceived by one eye of the viewer and convert light beams obtained from holograms of the second type into images perceived by the other eye of the viewer, whereby the viewer sees the image in a three-dimensional view; wherein each light-distribution planar ridge waveguide contains holograms of the first type and of the second type, and wherein the core is located on the outer surface of the cladding.

2. The autostereoscopic display assembly as claimed in claim 1, wherein a reflective coating is formed between the cladding and the substrate that supports the cladding.

3. An autostereoscopic display assembly based on digital semiplanar holography comprising:
   light sources for generating polarized monochromatic lights of at least one color;

a lightguide plate connected to the light sources;
a modified liquid-crystal display applied onto the lightguide plate, wherein the modified liquid-crystal display has a matrix structure composed of a plurality of pixels wherein each pixel contains a plurality of subpixels of a first type and a second type;
a lightguide plate comprising a substrate, a cladding on the substrate, and a core having a thickness;
a waveguide net that is arranged on the substrate and comprises at least one main planar ridge waveguide that has light-receiving holograms; and a plurality of light-distribution planar ridge waveguides that are optically coupled with light-receiving holograms of at least one main planar ridge waveguide;
light-distribution planar ridge waveguides containing a plurality of holograms of a first type and a plurality of holograms of a second type, wherein the holograms of the first type and the holograms of the second type emit beams that have different directions and that are emitted from the lightguide plate to the modified liquid-crystal display at different angles to the plane of the substrate so that on the modified liquid-crystal display the beams emitted from the holograms of the first type interact-with subpixels of the-first type, and the beams emitted from the holograms of the second type interact on the modified liquid-crystal display with subpixels of the second type; wherein the light-distribution planar ridge waveguide receiving a monochromatic light of at least one wavelength; wherein subpixels of the first type convert light beams obtained from the holograms of the first type into images perceived by one eye of the viewer and convert light beams obtained from holograms of the second type into images perceived by the other eye of the viewer, whereby the viewer sees the image in a three-dimensional view; wherein each light-distribution planar ridge waveguide contains holograms of the first type and of the second type, and wherein the core is embedded in the cladding.

4. The autostereoscopic display assembly as claimed in claim 3, wherein a reflective coating is formed between the cladding and the substrate that supports the cladding.

5. An autostereoscopic display assembly based on digital semiplanar holography comprising:
light sources for generating polarized monochromatic lights of at least one color;
a lightguide plate connected to the light sources;
a modified liquid-crystal display applied onto the lightguide plate, wherein the modified liquid-crystal display has a matrix structure composed of a plurality of pixels wherein each pixel contains a plurality of subpixels of a first type and a second type;
a lightguide plate comprising a substrate, a cladding on the substrate, and a core having a thickness;
a waveguide net that is arranged on the substrate and comprises at least one main planar ridge waveguide that has light-receiving holograms; and a plurality of light-distribution planar ridge waveguides that are optically coupled with light-receiving holograms of at least one main planar ridge waveguide;
light-distribution planar ridge waveguides containing a plurality of holograms of a first type and a plurality of holograms of a second type, wherein the holograms of the first type and the holograms of the second type emit beams that have different directions and that are emitted from the lightguide plate to the modified liquid-crystal display at different angles to the plane of the substrate so that on the modified liquid-crystal display the beams emitted from the holograms of the first type interact-with subpixels of the-first type, and the beams emitted from the holograms of the second type interact on the modified liquid-crystal display with subpixels of the second type; and
the light-distribution planar ridge waveguide receiving a monochromatic light of at least one wavelength, wherein subpixels of the first type convert light beams obtained from the holograms of the first type into images perceived by one eye of the viewer, and convert light beams obtained from holograms of the second type into images perceived by the other eye of the viewer, whereby the viewer sees the image in a three-dimensional view; wherein holograms of the first type emit light beams that on the modified liquid-crystal display fall onto respective subpixels of the first type, and holograms of the second type emit light beams that fall onto respective subpixels of the second type; and wherein each hologram of the first and second type is made with a smooth generating function that prevents generation of speckles in the image of the modified liquid-crystal display.

* * * * *